(12) United States Patent
Eldefrawy

(10) Patent No.: US 10,719,594 B2
(45) Date of Patent: Jul. 21, 2020

(54) SECURE RE-ENROLLMENT OF BIOMETRIC TEMPLATES USING DISTRIBUTED SECURE COMPUTATION AND SECRET SHARING

(71) Applicant: SRI International, Menlo Park, CA (US)

(72) Inventor: Karim Eldefrawy, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 258 days.

(21) Appl. No.: 15/945,559

(22) Filed: Apr. 4, 2018

(65) Prior Publication Data
US 2019/0311096 A1   Oct. 10, 2019

(51) Int. Cl.
*G06F 21/32*   (2013.01)
*H04L 9/08*   (2006.01)

(52) U.S. Cl.
CPC .............. *G06F 21/32* (2013.01); *H04L 9/085* (2013.01)

(58) Field of Classification Search
CPC ....... G06F 21/32; H04L 9/085; H04L 9/0894; H04L 9/008; H04L 9/3231
See application file for complete search history.

(56) References Cited

U.S. PATENT DOCUMENTS

| | | |
|---|---|---|
| 5,991,408 A | 11/1999 | Pearson et al. |
| 6,038,315 A | 3/2000 | Strait et al. |
| 7,769,210 B2 * | 8/2010 | Ito .................... G06F 21/32 382/115 |
| 10,142,333 B1 * | 11/2018 | Griffin .............. H04L 63/0861 |
| 2007/0118758 A1 | 5/2007 | Takahashi et al. |

(Continued)

FOREIGN PATENT DOCUMENTS

| | | |
|---|---|---|
| JP | 2007148470 A | 6/2007 |
| JP | 2008502070 A | 1/2008 |

(Continued)

OTHER PUBLICATIONS

Tulyakov et al, Symmetric Hash Functions for Fingerprint Minutiae, 2005, Springer, 9 Pages (Year: 2005).*

(Continued)

*Primary Examiner* — Christopher C Harris
(74) *Attorney, Agent, or Firm* — Shumaker & Sieffert, P.A.

(57) ABSTRACT

An example computing device includes a shares generation unit configured to generate secret shares of biometric information of a user; a storage interface configured to interface with storage nodes for storing each of the secret shares to a corresponding one of the storage nodes; and a computation engine configured to perform re-enrollment by outputting a plurality of messages to instruct each of the storage nodes to generate a respective share of a new helper data in accordance with the secret shares of the biometric information and a secure computation protocol, receive the respective share of the new helper data from two or more storage nodes, and determine the new helper data based on the respective share of the new helper data from each of the two or more storage nodes for subsequent authentication of the user, wherein the re-enrollment occurs without receiving additional/repeat biometric information, thereby resulting in faster re-enrollment.

20 Claims, 5 Drawing Sheets

(56) References Cited

U.S. PATENT DOCUMENTS

| | | | | |
|---|---|---|---|---|
| 2007/0253608 | A1* | 11/2007 | Tulyakov | G06K 9/00073 |
| | | | | 382/125 |
| 2008/0019573 | A1 | 1/2008 | Baltatu et al. | |
| 2010/0066493 | A1* | 3/2010 | Rachlin | G06K 9/00885 |
| | | | | 340/5.82 |
| 2012/0159600 | A1* | 6/2012 | Takagi | G06F 21/32 |
| | | | | 726/7 |
| 2019/0138753 | A1* | 5/2019 | Wallrabenstein | G09C 1/00 |

FOREIGN PATENT DOCUMENTS

| | | |
|---|---|---|
| JP | 2012044670 A | 3/2012 |
| WO | 2005122059 A | 12/2005 |

OTHER PUBLICATIONS

Uludag et al, Securing Fingerprint Template: Fuzzy Vault with Helper Data, 2006, IEEE, 8 Pages (Year: 2006).*

Baron et al., "How to Withstand Mobile Virus Attacks, Revisited," Proceedings of the 2014 ACM symposium on Principles of distributed computing, Jul. 15-18, 2014, 34 pp.

Ben-Or et al., "Completeness Theorems for Non-Cryptographic Fault-Tolerant Distributed Computation," Jan. 1988, 10 pp.

Peterson, "OPM Says 5.6 Million Fingerprints Stolen in Cyberattack, Five Times as Many as Previously Thought," Washington Post, Sep. 23, 2015, 2 pp.

"IOM Access2000," retrieved from https://www.princetonidentity.com, Jul. 11, 2018, 3 pp.

Eldefrawy et al., "System and Methods for Secure Re-Enrollment of Biometric Templates in a (Cryptographically) Secure Biometrics-Based Identification, Authentication and Access-Control System (BIAA) Using Functional Encryption (FE)," Computer Science Laboratory, SRI international, Apr. 14, 2017, 8 pp.

"Lagrange Polynomial," Wikipedia, the free encyclopedia, retrieved from https://en.wikipedia.org/wiki/Lagrange_polynomial, Jun. 29, 2018, 8 pp.

"Shamir's Secret Sharing," Wikipedia, the free encyclopedia, retrieved from https://en.wikipedia.org/wiki/Lagrange_polynomial, Jun. 29, 2018, 7 pp.

Shamir, "How to Share a Secret," Communications of the ACM, vol. 22, No. 11, Nov. 1979, pp. 612-613.

Hersberg et al., "Proactive Secret Sharing or: How to Cope with Perpetual Leakage," Advantages in Cryptology, CRYPTO '95, Jan. 1995, pp. 339-352.

Dolev et al., "Proactive Secret Sharing with a Dishonest Majority," Proceedings of the Security and Cryptography for Networks: 10th International Conference, Aug. 31-Sep. 2, 2016, 20 pp.

Maurer, "Secure Multi-Party Computation Made Simple," Discrete Applied Mathematics, vol. 154, No. 2, Feb. 1, 2006, pp. 370-381.

"Fuzzy Extractor," Wikipedia, the free encyclopedia, retrieved from https://en.wikipedia.org/wiki/Fuzzy_extractor, Jun. 29, 2018, 9 pp.

Dodis et al., "Fuzzy Extractors: How to Generate Strong Keys from Biometrics and Other Noisy Data," Advances in Cryptology—EUROCRYPT 2004. Lecture Notes in Computer Science, vol. 3027, Jan. 20, 2008, 47 pp.

Juels et al., "A Fuzzy Vault Scheme," Proceedings IEEE International Symposium on Information Theory, Jun. 30-Jul. 5, 2002, 18 pp.

U.S. Appl. No. 15/991,037, filed May 29, 2018, by Eldefrawy et al.

Goldreich., "General Cryptographic Protocols," Chapter 7, Foundations of Cryptography, Volume II Basic Applications, digitally printed version 2009, 449 pp. (Applicant points out, in accordance with MPEP 609.04(a), that the year of publication, 2009, is sufficiently earlier than the effective U.S. filing date, so that the particular month of publication is not in issue.)

The Notification of Rejection, and translation thereof, from counterpart Japanese Application No. 2019-072053, dated Apr. 7, 2020, 4 pp.

* cited by examiner

SECURE RE-ENROLLMENT OF BIOMETRIC TEMPLATES USING DISTRIBUTED SECURE COMPUTATION AND SECRET SHARING

BACKGROUND

Authentication systems, e.g., Biometrics-based Identification, Authentication and Access control (BIAA) systems, process and analyze biometric information of a user to determine whether to provide the user with secure access and privileges to physical or virtual environments. During a user's initial use of these authentication systems, the authentication systems typically "enroll" (i.e., process and store) the user's biometric information. For example, authentication systems may process and store a template of the user's biometric sample (referred to as a "biometric template" or "Reference Biometric Template" (RBT)) that is a reference of the user's biometric information. The stored RBT is used to compare with a user's subsequent biometric sample to authenticate the user. However, in the case of a security breach, the RBT may be compromised and used to circumvent the authentication systems.

Some conventional authentication systems use cryptographic algorithms to generate so-called 'helper data,' which generally refers to information used to authenticate the user. In these conventional authentication systems, helper data is typically computed from the user's biometric information and is stored in place of RBTs to ensure that no information of the original biometric information is stored in the authentication system. In the event of a security breach or update, these conventional authentication systems need to collect additional or repeat biometric information of users to generate new helper data because the original biometric information is not stored. However, in installations or security domains with a large number of users, the collection of original or new biometrics for the users is a manual process that is cumbersome, or even impractical, process. Thus, there is a need for a more automated and efficient process for re-enrollment of biometric information from previously enrolled users.

SUMMARY

In general, this disclosure describes techniques for performing biometric re-enrollment using secure distributed secret sharing within a networked authentication system. As described herein, the techniques enable re-enrollment and computation of new helper data for user authentication without having to recover or otherwise reuse the original biometric information for a user and without having to re-acquire additional or repeat biometric information of the user. For example, during initial enrollment, a computing device of a biometric authentication system collects and processes biometric information of the user and generates initial helper data for user authentication. After constructing the helper data, the computing device initiates a distributed secret sharing process with a plurality of secure servers to generate and store a plurality of secret shares according to a representation of (e.g., a multi-polynomial representation of) the biometric information in a secure and distributed manner.

In the event of a security breach or update, instead of having to acquire additional or repeat biometric information for each of the users to generate new helper data, the computing device coordinates computation of new helper data (e.g., by using a generate function of a fuzzy extractor) using the distributed, secure secret shares so that the original biometric information is never revealed by the distributed servers or reconstituted in its entirety by the computing device coordinating the process. For example, in one implementation, the computing device may output a plurality of messages to instruct each of the distributed storage nodes to apply the generate function of the fuzzy extractor to generate a respective secret share of new helper data in accordance with the respective secret share of the biometric information stored by the storage node in secret share format. The storage nodes each send their respective shares of the new helper data to the computing device, which in turn determines, e.g., by combining the respective shares of the new helper data to recover a new polynomial resulting from the distributed application of the generate function of the fuzzy extractor, the new helper data for subsequent authentication of the user.

In this way, re-enrollment of users can be performed without having to reacquire additional or repeat biometric information from the users and without having to recover or otherwise reuse the original biometric at any centralized, potentially unsecure node or device. As such, the techniques provide technical solutions that enable the secure automation or bulk re-enrollment of biometric information, thereby resulting in faster re-enrollment, especially for large security domains with large numbers of users.

In one example, this disclosure describes a method including generating, by a computation engine of a biometric authentication system and according to biometric information of a user, helper data for authenticating the user. The method also includes generating, by the computation engine, a plurality of secret shares of the biometric information. The method further includes storing, by the computation engine, each of the plurality of secret shares of the biometric information to a corresponding one of a plurality of storage nodes. The method also includes performing, by the computation engine, re-enrollment of the biometric information by: outputting a plurality of messages to instruct each of the plurality of storage nodes to generate a respective share of a new helper data in accordance with the plurality of secret shares of the biometric information and a secure computation protocol, receiving the respective share of the new helper data from two or more storage nodes of the plurality of storage nodes, and determining the new helper data based on the respective share of the new helper data from each of the two or more storage nodes for subsequent authentication of the user, wherein the re-enrollment occurs without receiving additional or repeat biometric information of the user and thereby results in faster re-enrollment.

In another example, this disclosure describes a computing device of a biometric authentication system comprising: a shares generation unit implemented in circuitry and configured to generate a plurality of secret shares of biometric information of a user; a storage interface implemented in circuitry and configured to: interface with a plurality of storage nodes for storing each of the plurality of secret shares to a corresponding one of the plurality of storage nodes; and a computation engine implemented in circuitry and configured to: generate helper data according to biometric information of the user for authenticating a user, and perform a re-enrollment of the biometric information, wherein to perform the re-enrollment of the biometric information, the computation engine is configured to: output a plurality of messages to instruct each of the plurality of storage nodes to generate a respective share of a new helper data in accordance with the plurality of secret shares of the biometric information and a secure computation protocol, receive the respective share of a new helper data from two or more storage nodes of the plurality of storage nodes, and determine the new helper data based on the respective share of the new helper data from each of the two or more storage nodes for subsequent authentication of the user, wherein the re-enrollment occurs without receiving additional or repeat biometric information of a user and thereby results in faster re-enrollment.

In another example, this disclosure describes a computer-readable storage medium of a biometric authentication system having stored thereon instructions that, when executed, cause a processor to: generate, according to biometric information of a user, helper data for authenticating the user; generate, according to the biometric information of the user, a plurality of secret shares of the biometric information; store each of the plurality of secret shares of the biometric information to a corresponding one of a plurality of storage nodes; and perform re-enrollment of the biometric information, wherein the instructions to perform re-enrollment of the biometric information comprise instructions that, when executed, cause the processor to: output a plurality of messages to instruct each of the plurality of storage nodes to generate a respective share of a new helper data in accordance with the plurality of secret shares of the biometric information and a secure computation protocol, receive a respective share of the new helper data from two or more storage nodes of the plurality of storage nodes, and determine the new helper data based on the respective share of the new helper data from each of the two or more storage nodes for subsequent authentication of the user, wherein the re-enrollment occurs without receiving additional or repeat biometric information of a user and thereby results in faster re-enrollment.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
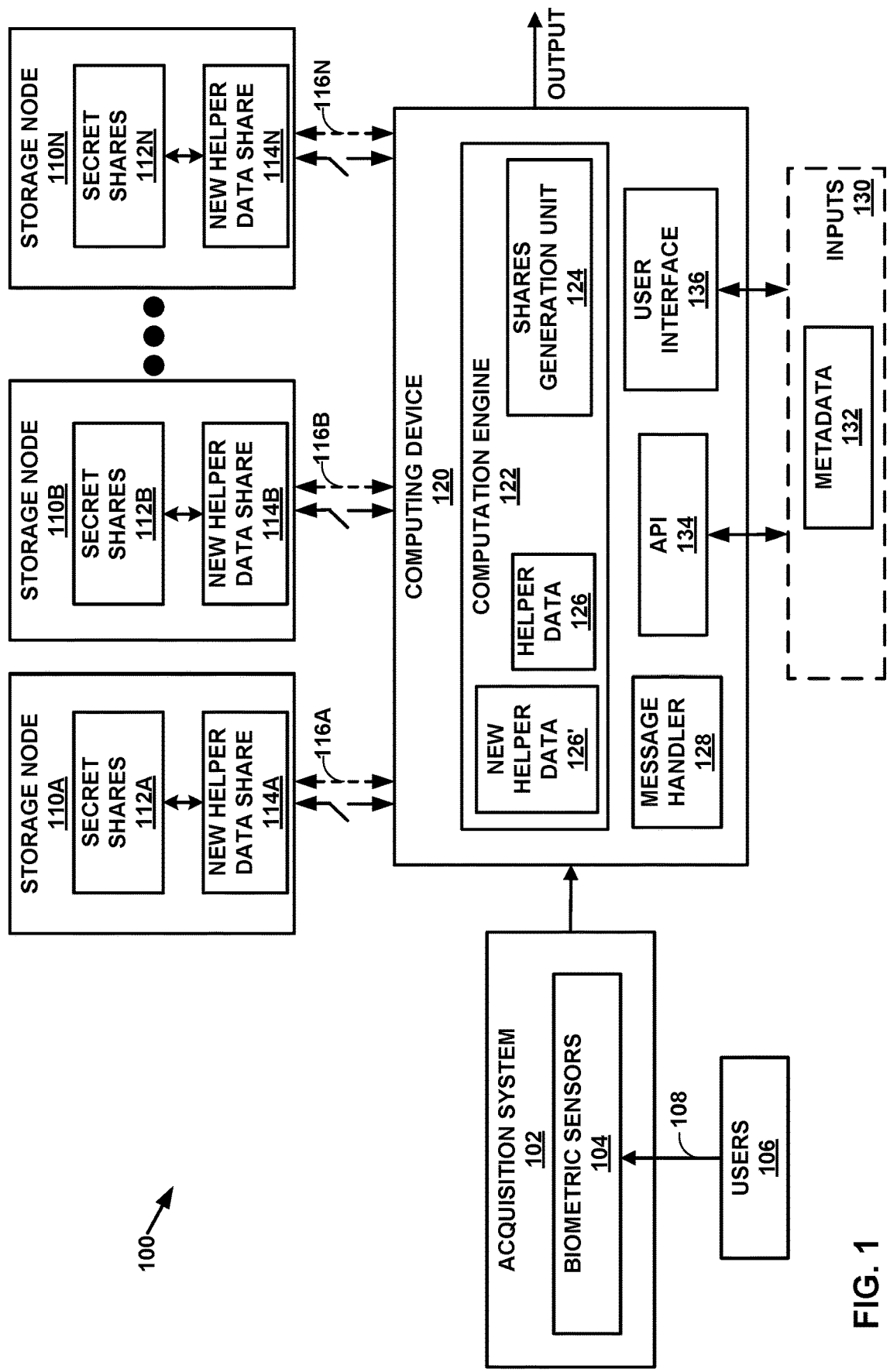
FIG. 1 illustrates an example biometric authentication system, in accordance with one or more aspects described in this disclosure.

FIG. 1 illustrates an example biometric authentication system 100, in accordance with one or more aspects described in this disclosure. In this example configuration, biometric authentication system 100 comprises at least an acquisition system 102, a computation engine 122 executing on an execution environment provided by computing devices 120, and a plurality of storage nodes 110A-110N (collectively, "storage nodes 110").

Acquisition system 102 accepts input from one or more biometric sensors 104 to acquire biometric information for one or more users. For instance, acquisition system 102 may comprise one or more biometric sensors 104 that include, fingerprint scanners (capacitive or optical), palm scanners, facial recognition scanners, facial expression scanners, iris/retina scanners, infrared cameras, heart rate scanners, gait sensors (e.g., video or accelerometers), or other biometric sensors that read biometric information 108 from users 106. Biometric information may include a biometric sample that comprises an image of a fingerprint, an image of a palm print, an image of a face, an image of a retinal scan, an image of an iris, heart rate patterns, movement of limbs, binary code in the case of an iris or audio sample, or the like, or a combination of two or more of such elements. In some examples, the components of acquisition system 102, including biometric sensors 104, are included within one physical structure. In some examples, the biometric sensors 104 are in different physical structures.

In some examples, biometric sensors 104 may read biometric samples from users 106 seeking access and/or privileges to physical and/or virtual environments, e.g., a software application, a physical lock, or other type of secure storage or application. Acquisition system 102 may receive biometric samples (e.g., images of fingerprints) from biometric sensors 104 and send the biometric samples to computation engine 122 for processing and storage, as further described below.

Computation engine 122 may be implemented in circuitry on one or more physical computing devices 120. For example, computation engine 122 may be implemented using a cluster of one or more server devices, server blades, personal computers, mobile computing devices, and/or other types of computing devices. For clarity, computing devices 120 are omitted from the remaining figures. However, it should be understood that in the context of other figures, computation engines are implemented in circuitry on one or more physical computing devices. In some examples, acquisition system 102 has screens or monitors that computation engine 122 can use to control and/or configure the operations of computation engine 122.

Computation engine 122 may include an application programming interface 134 and user interface 136 to receive inputs 130 from an operator, such as metadata 132. Metadata 132 may comprise data about objects, machines, people, or other information acquired by acquisition system 102. User interface 136 may comprise a graphical user interface, a command line interface, or another type of user interface that receives indications of user input from a user. API 134 may comprise an interface through which a software application can interact with computation engine 122. For instance, a software application may use API 134 to enable computation engine 122 to get data.

Storage nodes 110 may represent local or remote storage units for storing computer-readable data. For example, storage nodes 110 may represent any or all of hard drives, flash drives, Universal Storage Bus (USB) devices, tape drives, hard drives, floppy disks, compact disks, removable storage devices, etc. that are physically coupled to computing device 109, as well as storage devices that are physically coupled to remote computing devices, such as server devices. Storage nodes 110 may each be implemented using one or more computing devices, such as Network Attached Storage (NAS) devices, Storage Area Network (SAN) devices, server devices, or other types of computing devices. Storage nodes 110 may store various types of data. For example, storage nodes 110 may store secret shares 112 of the biometric information and new helper data shares 114 (as described further below), inputs 130, outputs of computation engine 122, reference data, and other types of data.

In some examples, storage nodes 110 may comprise online and offline storage devices. For example, one or more storage nodes 110 may be configured as temporarily accessible and are accessible only on a needed basis (e.g., during re-enrollment). In some examples, one or more storage nodes 110 may be physically removed from the one or more physical computing devices 120 and connected only on a needed basis (e.g., during re-enrollment). In some examples, storage nodes 110 may comprise geographically dispersed storage devices. Computing engine 122 may include a storage interface implemented in circuitry that is configured to interface with storage nodes 110.

During a user's initial use of biometric authentication system 100, biometric authentication system 100 "enrolls" biometric information of the users for subsequent authentication of the users. That is, biometric authentication system 100 collects and processes the biometric information to generate helper data 126 for each user subsequent authentication of the respective user. For example, computation engine 122 may initially process biometric samples received from acquisition system 102 and determine indicia of biometric information from the biometric samples. Indicia of biometric information may include minutiae points of a fingerprint, iris codes in the case of eye scans, or other points of granularity of a biometric sample. Computation engine 122 may compute a template (referred to herein as a "biometric template," "Reference Biometric Template" or "RBT") according to the indicia of biometric information. The RBT is a template that provides a reference of the points of granularity extracted from a biometric sample. For example, an RBT for a fingerprint scan may identify the coordinates and orientation of specific points (e.g., ridge endings, ridge bifurcations, short ridges, etc.) of a fingerprint. Computing engine 122 may receive an image of a fingerprint and divide the image into blocks. Each block includes a part of the image of the fingerprint. Computation engine 122 determines the coordinates of indicia of the fingerprint within each block (in relation to other blocks) and an orientation of the indicia of the fingerprint (e.g., the direction of an underlying ridge or bifurcation).

In this example of FIG. 1, as noted above, centralized computing device 120 of biometric authentication system 100 generates respective helper data 126 for each user for subsequent authentication of the user. As one example, helper data 126 may comprise a random string that is information about the RBT that could be made public but does not reveal any significant information of the RBT. Biometric authentication system 100 utilizes helper data 126 for authentication of that user. For example, biometric authentication system 100 may use helper data with a subsequent biometric sample (e.g., a noisy version of the biometric sample) to reconstruct a digital key or identifier that provides access or privileges for the authenticated user.

In some examples, biometric authentication system 100 uses one or more cryptographic algorithms, including, but not limited to, a fuzzy extractor scheme or a fuzzy vault scheme, to generate helper data 126. As one example, a fuzzy extractor scheme comprises two functions: a "Generate" function and a "Regenerate" function. The Generate function is executed to generate a digital key (Key) and one or more public parameters (Pub), where w represents an input of a string of data from a biometric sample converted to an RBT or another suitable form, as shown below:

$$\text{Generate}(w) = (\text{Key}, \text{Pub}) \quad \text{Function 1}$$

In general, helper data 126 is obtained by binding or locking a digital key (e.g., a random cryptographic key) with the RBT. Following the generation of helper data, the helper data is stored in a readily-accessible storage area for subsequent authentication of users 106 (illustrated as "helper data 126" in FIG. 1), and the RBT is typically discarded to avoid storing biometric information in the online portion of the biometric authentication system. Although helper data 126 is illustrated as stored in a readily-accessible storage within computing device 120, helper data 126 may be stored in a readily-accessible storage external to computing device 120.

After generation of helper data 126, biometric authentication system 100 uses subsequent biometric samples to authenticate users 106. For example, biometric authentication system 100 uses helper data 126 generated during initial enrollment together with the subsequent biometric samples to reconstruct the digital key that provides access or privileges for the authenticated user. As one example, a Regenerate function is used to reconstruct digital key (Key') that is used for authenticating the user, where w' represents an input of a string of data from a subsequent biometric sample converted to an RBT or another suitable form and Pub is the public parameters generated during initial enrollment, as shown below:

$$\text{Key}' = \text{Regenerate}(\text{Pub}, w') \quad \text{Function 2}$$

In some example, Key' is generated if the difference between the initial biometric sample and the subsequent biometric sample is within the defined threshold (d), which is a tunable parameter that defines an acceptable detection accuracy, as shown below:

$$\text{Key}' = \text{Key if } |w - w'| < d \quad \text{Function 3}$$

The value of the threshold may be chosen to improve or maximize the detection accuracy. In some examples, the threshold may be defined to maximize Genuine Accept Rate (GAR) and to minimize False Accept Rate (FAR). As one example, the user may subsequently provide a noisy version of a biometric sample in which the difference between the initial biometric sample and the subsequent noisy version of the biometric sample is not within an acceptable detection accuracy threshold. As a result, Key' is not generated. If the difference between the initial biometric sample and the subsequent noisy version of the biometric sample is within an acceptable detection accuracy threshold, Key' is generated and the user is authenticated.

In the event of an update or security breach of biometric authentication system 100, helper data 126 generated during initial enrollment may be compromised. To generate new helper data, conventional authentication systems typically need to store and reuse the original biometric information, which puts the original biometric information at risk, or would need previously enrolled users (or compromised users) to provide additional or repeat biometric information. However, in large-scale systems, the re-enrollment process may require a large number of users to each manually provide additional or repeat biometric information, which is an inefficient and sometimes an impractical process.

In accordance with the techniques of this disclosure, computing device 120 coordinates biometric re-enrollment using secure distributed secret sharing within authentication system 100. As described herein, the techniques enable re-enrollment and computation of new helper data 126' for user authentication without having to recover or otherwise reuse the original biometric information at computing device 120 and without having to re-acquire additional or repeat biometric information. For example, during initial enrollment, computation engine 122 of computing device 120 collects and processes biometric information of the user and generates initial helper data 126 for user authentication. After constructing helper data 126, and prior to discarding the biometric information (e.g., RBT), computation engine 122 initiates a distributed secret sharing process with a plurality of secure storage nodes 110 (e.g., storage servers distributed within one or more network domains) to generate and store, in a secure and distributed manner, a plurality of secret shares 112A-112N (collectively, "secret shares 112" or "secret share values 112") according to a representation of (e.g., a multi-polynomial representation of) the biometric information.

For example, during enrollment, shares generation unit 124 coordinates secure computation of secret shares 112 using a shared secret scheme in which a multi-polynomial representation of the biometric information is used as the shared secret. Initially, shares generation unit 124 processes the biometric information to determine a representation of the biometric to be used as the shared secret in the secure computation of the helper data. For example, an RBT for a fingerprint may include a set of minutiae points in which each minutiae point comprises coordinates (e.g., $X_n$ and $Y_n$) and an orientation (e.g., $O_n$) of ridge endings, ridge bifurcations, short ridges, etc, of an image of a fingerprint. That is, each minutiae point is defined by an X-coordinate of a specific point in the image of a fingerprint, a Y-coordinate of the specific point in the image of the fingerprint, and the orientation of the specific point in the image of the fingerprint. In this example, shares generation unit 124 may encode (otherwise referred to as 'secret sharing') coordinates and orientations, e.g., $(X_1,Y_1,O_1)$, $(X_2,Y_2,O_2)$, ... $(X_n,Y_n,O_n)$, for each respective minutia point. In determining the shared secret to be used, shares generation unit 124 may convert each of the coordinates and orientations of the RBT to an integer value that is stored as the free term (p(0)) of a respective polynomial, e.g., $p_1(0)=X_1$, $p_2(0)=Y_1$, and $p_3(0)=O_1$ (or in some examples, shares generation unit 124 converts the coordinates and orientation to a single integer value). In this example, three polynomials (i.e., $p_1(x)$, $p_2(x)$, and $p_3(x)$) are used to share a single minutiae point (e.g., $(X_1,Y_1,O_1)$). In other words, polynomial $p_1(x)$ is used to encode an X-coordinate of a single minutiae point, $p_2(x)$ is used to encode a Y-coordinate of the single minutiae point, and $p_3(x)$ is used to encode the orientation of the single minutiae point.

As further described below, shares generation unit 124 may then evaluate each polynomial at a minimum of "n" points, where "n" is the number of shares needed to determine the free term of the polynomial. Continuing the example above, assume a respective parabola is used to encode corresponding portions of the biometric information (e.g., the X-coordinate, the Y-coordinate, and orientation). Shares generation unit 124 may generate at the shared secret by evaluating the parabola at three points, e.g., $p_1(1)$, $p_1(2)$, and $p_1(3)$, that represent evaluated points at X=1, X=2, and X=3, respectively, of the parabola. In this example, a minimum of three shares is generated such that at least three shares are needed to determine the encoded portion of the biometric, e.g., the value that is stored as the free term of a respective polynomial, e.g., $p_1(0)=X_1$. Without knowledge of at least three shares, the portion of the biometric information encoded in the free term of the polynomial remains unknown. Although three shares for each of the three polynomials are used in this example, any number of polynomials and/or number of shares may be used to encode indicia of biometric information. Although described with respect with Shamir's secret-sharing scheme, shares generation unit 124 may implement any secret-sharing technique that can be extended to enable computation on secret shared data via the techniques described herein or other secure computation techniques. Additional example information with respect to secure computation protocols is described in Baron, Joshua, et. al., "How to withstand mobile virus attacks, revisited," dated July 2014; Ben-Or, Michael, et. al., "Completeness theorems for non-cryptographic fault-tolerant distributed computation," dated May 1988; and Goldreich, Oded, "Foundations of Cryptography: Volume 2, Basic Applications," dated 2004, the entire contents of each of which are incorporated by reference herein.

After computing the secret shares from the RBT, computing device 120 communicates each of the plurality of secret shares to a corresponding one of storage nodes 110 such that the corresponding storage nodes 110 each store secret shares of respective polynomials. Continuing the example of above, computing device 120 may use a storage interface (not shown) that is implemented in circuitry to interface with storage nodes 110 to store secret shares of polynomials that encode the X-coordinate, the Y-coordinate, and orientation of a respective minutiae point.

For example, the storage interface of computing device 120 may interface with storage node 110A (via a storage interface) to store a secret share value of $p_1(x)$ that encodes the X-coordinate, a secret share value of $p_2(x)$ that encodes the Y-coordinate, and a secret share value of $p_3(x)$ that encodes the orientation of a minutiae point. Computing device 120 may also use the storage interface to interface with storage node 110B to store another secret share value of $p_1(x)$ that encodes the X-coordinate, another secret share value of $p_2(x)$ that encodes the Y-coordinate, and another secret share value of $p_3(x)$ that encodes the orientation. Computing engine 122 may further use the storage interface to interface with storage node 110N to store yet another secret share value of $p_1(x)$ that encodes the X-coordinate, another secret share value of $p_2(x)$ that encodes the Y-coordinate, and another secret share value of $p_3(x)$ that encodes the orientation.

In some examples, the storage nodes 110 that store secret shares 112 are accessible only for re-enrollment (illustrated by the disconnected arrow between computing device 120 to storage nodes 110). That is, storage nodes 110 that store secret shares 112 may be physically disconnected from a network and only configured with temporary access during initial enrollment and during re-enrollment, if needed.

In the event of a security breach or update, instead of having to acquire additional or repeat biometric information for each of the users to generate new helper data, computing device 120 coordinates computation of new helper data 126' (e.g., by using a generate function of a fuzzy extractor or a similar scheme such as a fuzzy vault) using the distributed, secure secret shares 112 so that the original biometric information is never revealed by the distributed storage nodes 110 or reconstituted in its entirety by computing device 120 coordinating the process. For example, in one implementation, message handler 128 may output a plurality of messages 116 to instruct each of the distributed storage nodes 110 to apply the generate function of the fuzzy extractor or any similar scheme to generate a respective new helper data share 114 in accordance with the respective secret shares 112 of the biometric information stored by the storage node 110 in secret share format. Each storage node 110 sends their respective new helper data share 114 to computing device 110, which in turn determines, e.g., by combining the respective new helper data shares 114 to recover a new polynomial resulting from the distributed application of the generate function of the fuzzy extractor, which in turn is used to generate new helper data 126' for subsequent authentication of the user.

For example, when re-enrollment is required and after storage nodes 110 are made accessible, message handler 128 may output a plurality of messages, e.g., messages 116A-116N (collectively, "messages 116") to instruct each of storage nodes 110 to generate respective shares of a new helper data, e.g., new helper data shares 114. For example, storage node 110A may receive message 116A from computing device 120 and may generate a respective share of a new helper data, e.g., new helper data share 114A using secret shares 112A stored in storage node 110A. Similarly, storage node 110B may receive message 116B from computing device 120 and may generate a respective share of a new helper data, e.g., new helper data share 114B using secret shares 112B stored in storage node 110B. Storage device 110N may also receive message 116N from computing device 120 and may generate a respective share of a new helper data, e.g., new helper data share 114N using secret shares 112N stored in storage node 110N.

To generate new helper data using shares 112, each of storage nodes 110 may, for example, be instructed to perform a sequence of operations such as addition and multiplication operations to compute the generate function of a fuzzy extractor scheme in a secure distributed manner without reconstructing the secret shared biometric and thus generating new helper data shares 114. For example, storage node 110A may add the secret shared values in secret shares 112A (e.g., $p_{sum}(x)=p_1(x)+p_2(x)+p_3(x)$) stored in storage node 110A to generate new helper data share 114A. Similarly, storage node 110B may add the secret shared values in secret shares 112B stored in storage node 110B to generate new helper data share 114B. Likewise, storage node 110N may add the secret shared values in secret shares 112N stored in storage node 110N to generate new helper data share 114N. That is, each of storage nodes 110 generate a respective share of the new helper data that is in secret shared format.

Alternatively, or additionally, storage nodes 110 may use, for example, a multiplication operations to compute the generate function of a fuzzy extractor scheme in a secure distributed manner without reconstructing the secret shared biometric and thus generating new helper data shares 114. For example, storage node 110A may multiply secret shares 112A of the biometric information stored in storage node 110A. The product of secret shares 112A is used with a shared multiplication triple (e.g., a*b=c) to generate shares of a new polynomial that has encoded the product of the secret shared values in secret shares 112A. Similarly, storage node 110B may multiply the secret shared values in secret shares 112B stored in storage node 110B such that the product of the secret shared values in secret shares 112B is used with a shared multiplication triple (e.g., a*b=c) to generate shares of a new polynomial that has encoded the product of the secret shared values in secret shares 112B. Likewise, storage node 110N may multiply the secret shared values in secret shares 112N stored in storage node 110N such that the product of the secret shared values in secret shares 112N is used with a shared multiplication triple (e.g., a*b=c) to generate shares of a new polynomial that has encoded the product of the secret shared values in secret shares 112N. Although described using a multiplication triples technique, storage nodes 110 may use other multiplication techniques, such as homomorphic encryption, to generate new helper data shares 114.

After computing new helper data shares 114, storage nodes 110A-110N may send a plurality of messages, e.g., messages 116, including the new helper data shares 114A-114N, respectively, to computing device 120 for which computation engine 122 of computing device 120 may determine, in accordance with the new helper data shares 114, the new helper data, e.g., new helper data 126', for subsequent authentication of users 106. For example, computation engine 122 may combine the new helper data shares 114 received from storage nodes 110 to recover a new polynomial resulting from the distributed application of the generate function of the fuzzy extractor. Computation engine 122 may apply interpolation to the recovered polynomial to generate a constant for the polynomial for use as the new helper data 126'.

In this way, biometric authentication systems, such as biometric authentication system 100, may generate new helper data without receiving additional or repeat biometric information of a user and without having to recover or otherwise reuse the original biometric at any centralized, potentially insecure node or device, thereby providing technical solutions that enable faster and secure re-enrollment using potentially less computational resources and without putting at risk biometric information of the users.

Figure 2C:
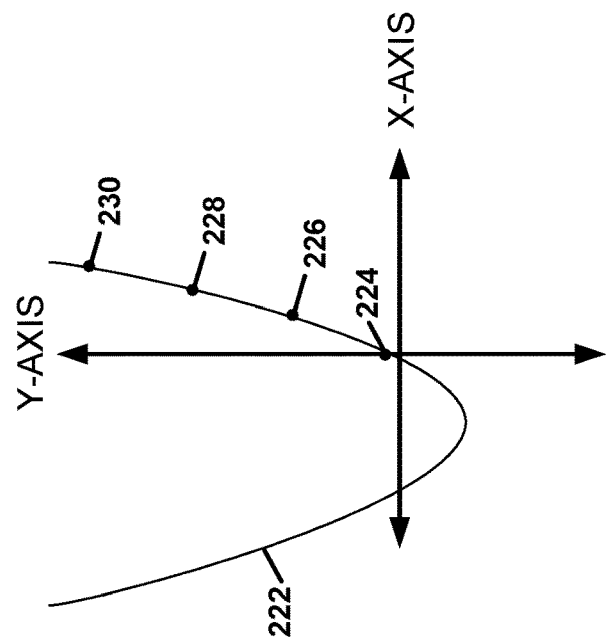
FIGS. 2A-2C are graphs illustrating example polynomials used for encoding biometric information, in accordance with one or more aspects of this disclosure.
Figure 2B:
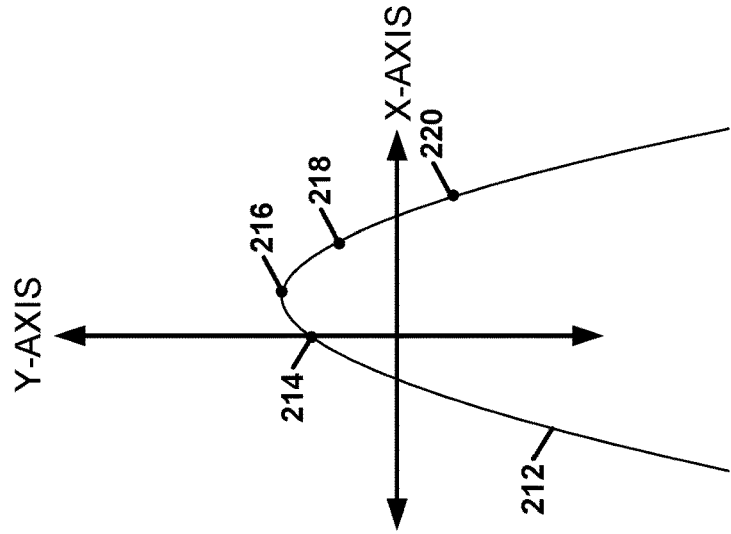
Figure 2A:
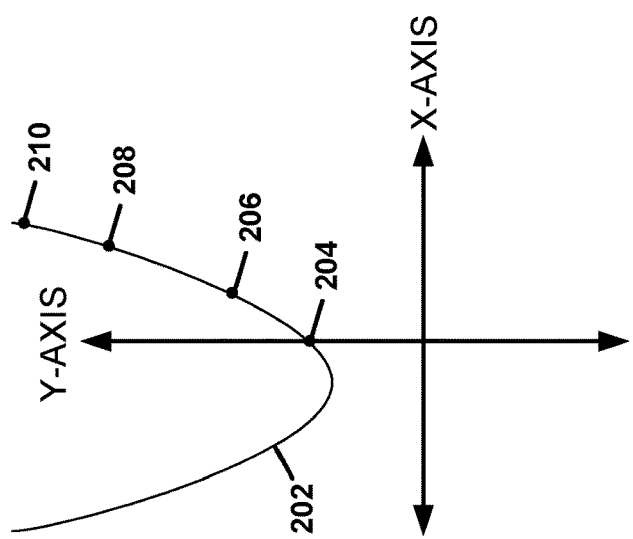

FIGS. 2A-2C are graphs illustrating example polynomials 202, 212, and 222 that can be used for encoding biometric information, in accordance with one or more aspects of this disclosure. FIGS. 2A-2C are not drawn to scale and are collectively illustrated as one example in which three polynomials are used to encode respective portions of biometric information representative of a fingerprint in accordance with the techniques described herein. Although FIGS. 2A-2C are used as an example for encoding biometric information of a fingerprint, FIGS. 2A-2C may represent any polynomial used to encode indicia of any type of biometric information.

In the example of FIG. 2A, polynomial 202 is used to secretly share the X-coordinate ($X_1$) of a minutiae point, $X_1, Y_1, O_1$, of a fingerprint. For ease of illustration, polynomial 202 is a parabola, where at least three secret shared values are required to determine an encoded value in the parabola, but may be defined as any polynomial of degree "t–1" where "t" is the number of secret shared values needed to determine an encoded value in the polynomial. The free term, e.g., point 204 of polynomial 202 ($p_1(0)$), may represent an encoded value of a portion of the biometric information, e.g., an integer representing the X-coordinate ($X_1$) of a minutiae point, $X_1, Y_1, O_1$. For example, $p_1(0)$ may represent the point where the graph intersects the Y-axis and where X=0. In the example of FIG. 2A, $p_1(0)$ may have a value of 10. Since "t" is three, shares generation unit 124 may configure two random coefficient values ("t–1") such as 3 and 23. Polynomial 202 is therefore, $f(x)=10+3x+23x^2$. To encode the X-coordinate of the fingerprint at point 204 (e.g., 10), polynomial 202 is evaluated at "n" points that are secret shared values used to determine an encoded value at point 204 in polynomial 202. For example, computation engine 122 of FIG. 1 may compute secret share values 206, 208, and 210 from polynomial 202 (e.g., $p_1(x)=(x, f(x))$). For ease of illustration, polynomial 202 is illustrated with three evaluated secret share values (e.g., 206, 208, and 210), but may include more secret shared values from polynomial 202. Continuing the example above, secret shared value 206, where x=1, may represent a first value (e.g., $p_1(x)=(1, 36)$) of polynomial 202, secret shared value 208, where x=2, may represent a second value (e.g., $p_1(x)=(2, 105)$) of polynomial 202, and secret shared value 210, where x=3, may represent a third value (e.g., $p_1(x)=(3, 226)$) of polynomial 202. Shares generation unit 124 of computation engine 122 may store each of secret shared values 206, 208, and 210 in corresponding storage nodes 110 of FIG. 1.

In the example of FIG. 2B, polynomial 212 is used to secretly share the Y-coordinate ($Y_1$) of the minutiae point, $X_1, Y_1, O_1$, of the biometric information representing the fingerprint. For ease of illustration, polynomial 212 is a parabola, where at least three secret shared values are required to determine an encoded value in the parabola, but may be defined as any polynomial of degree "t−1" where "t" is the number of secret shared values needed to determine an encoded value in the polynomial. The free term, e.g., point 214 of polynomial 212 ($p_2(0)$), may represent an encoded value of a portion of the biometric information, e.g., an integer representing the Y-coordinate ($Y_1$) of the minutiae point, $X_1, Y_1, O_1$. For example, $p_2(0)$ may represent the point where the graph intersects the Y-axis and where X=0. In the example of FIG. 2B, $p_2(0)$ may have a value of 15. Since "t" is three, secret shares generation unit 124 may configure two random coefficient values ("t−1") such as 7 and −5. Polynomial 202 is therefore, $f(x)=15+7x-5x^2$. To encode the Y-coordinate of the fingerprint at point 214 (e.g., 15), polynomial 212 is evaluated at "n" points that are secret shared values used to determine an encoded value at point 214 in polynomial 212. For example, computation engine 122 of FIG. 1 may compute secret shared values 216, 218, and 220 from polynomial 212 (e.g., $p_2(x)=(x, f(x))$). For ease of illustration, polynomial 212 is illustrated with three secret shared values (e.g., 216, 218, and 220), but may include more secret shared values from polynomial 212. Continuing the example above, secret shared value 216, where x=1 may represent a first value (e.g., $p_2(x)=(1, 17)$) of polynomial 212, secret share value 218, where x=2, may represent a second value (e.g., $p_2(x)=(2, 9)$) of polynomial 212, and secret share value 220, where x=3, may represent a third value (e.g., $p_2(x)=(3, -9)$) of polynomial 212. Shares generation unit 124 of computation engine 122 may store each of secret share values 216, 218, and 220 in corresponding storage nodes 110 of FIG. 1.

In the example of FIG. 2C, polynomial 222 is used to secretly share the Orientation ($O_1$) of the minutiae point, $X_1, Y_1, O_1$, of the biometric information representing the fingerprint. For ease of illustration, polynomial 222 is a parabola, where at least three secret share values are sufficient to determine an encoded value in the parabola, but may be defined as any polynomial of degree "t−1" where "t" is the number of secret share values needed to determine an encoded value in the polynomial. The free term, e.g., point 224 of polynomial 222 ($p_3(0)$), may represent an encoded value of a portion of the biometric information, e.g., an integer representing the Orientation ($O_1$) of a minutiae point, $X_1, Y_1, O_1$. For example, $p_3(0)$ may represent the point where the graph intersects the Y-axis and where X=0. In the example FIG. 2C, $p_3(0)$ may have a value of 6. Since "t" is three, shares generation unit 124 may configure two random coefficient values ("t−1") such as 14 and 5. Polynomial 222 is therefore, $f(x)=6+14x+5x^2$. To encode the orientation of the fingerprint at point 224 (e.g., 6), polynomial 222 is evaluated at "n" points that are secret share values used to determine an encoded value at point 224 in polynomial 222. For example, computation engine 122 of FIG. 1 may compute shares 226, 228, and 230 from polynomial 222 (e.g., $p_3(x)=(x, f(x))$). For ease of illustration, polynomial 222 is illustrated with three secret share values (e.g., 226, 228, and 230), but may include more secret share values from polynomial 222. Continuing the example above, secret share value 226, where x=1, may represent a first value (e.g., $p_3(x)=(1, 25)$) of polynomial 222, secret share value 228, where x=2, may represent a second value (e.g., $p_3(x)=(2, 54)$) of polynomial 222, and secret share value 230, where x=3, may represent a third value (e.g., $p_3(x)=(3, 93)$) of polynomial 222. Shares generation unit 124 of computation engine 122 may store each of secret share values 226, 228, and 230 in corresponding storage nodes 110 of FIG. 1.

Storage nodes 110 may generate the new helper data shares 114 in accordance with the secret share values described above. For example, storage node 110A may generate a first new helper data share by multiplications and sums including computing a sum (e.g., $p_{sum1}(x)$) of secret share values 206, 216, and 226 of polynomials 202, 212, and 222, respectively. Similarly, storage node 110B may generate a second new helper data share by multiplications and sums including computing a sum (e.g, $p_{sum2}(x)$) of secret share values 208, 218, and 228 of polynomials 202, 212, and 222, respectively. Likewise, storage node 110N may generate a third new helper data share by multiplications and sums including computing a sum (e.g., $p_{sum3}(x)$) of secret share values 210, 220, and 230 of polynomials 202, 212, and 222, respectively. That is, each of storage nodes 110 generate a respective share of the new helper data that is in secret shared format. Storage nodes 110 may send the respective shares (e.g., $p_{sum1}(x)$, $p_{sum2}(x)$, and $p_{sum3}(x)$) of the new helper data to computing device 120 for which computation engine 122 of computing device 120 may determine the new helper data based on the respective shares of the new helper data. For example, combine the respective shares to recover the new polynomial that is encoding the new helper data.

Figure 3:
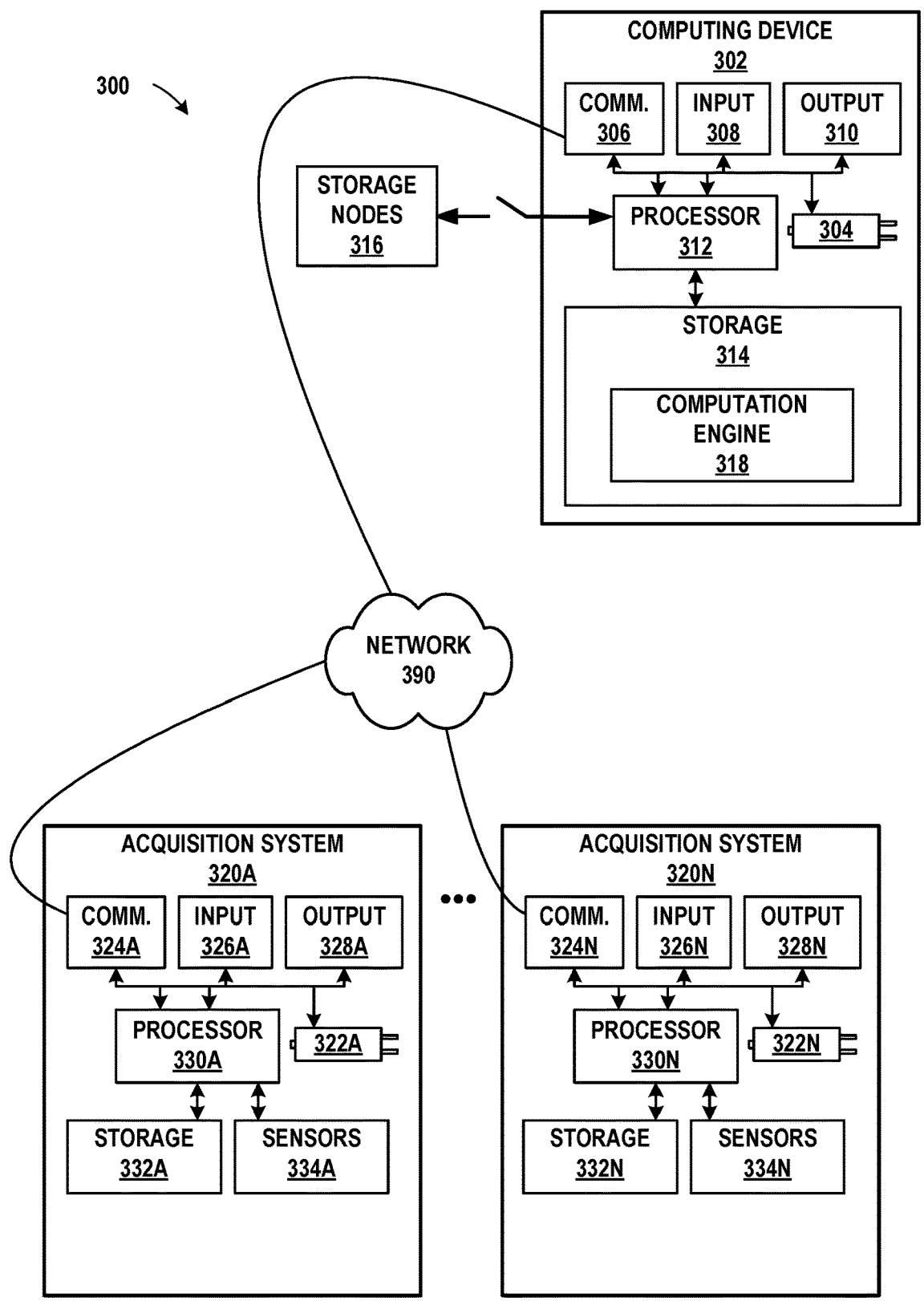
FIG. 3 is a block diagram illustrating an example biometric authentication system that is configured in accordance with one or more aspects of the present disclosure.

FIG. 3 is a block diagram illustrating an example biometric authentication system 300 that is configured in accordance with one or more aspects of the present disclosure. Biometric authentication system 300 of FIG. 3 is described below as an example or alternate implementation of biometric authentication system 100 of FIG. 1. However, FIG. 3 illustrates only one particular example or alternate implementation of biometric authentication system 100, and many other example or alternate implementations of biometric authentication system 100 may be used or may be appropriate in other instances. Such implementations may include a subset of the components included in the example of FIG. 3 or may include additional components not shown in the example of FIG. 3. Computing device 302 may communicate with acquisition systems 320A through 320N (collectively, "acquisition systems 320") through a network 390.

Computing device 302 of FIG. 3 implements computation engine 122 and shares generation unit 124 of FIG. 1. Computing device 302 includes power source 304, one or more communication units 306, one or more input devices 308, one or more output devices 310, one or more processors 312, one or more storage devices 314, and one or more storage nodes 316. One or more storage devices 314 may include a computing engine module 318. One or more of the devices, modules, storage areas, or other components of computing device 302 may be interconnected to enable inter-component communications (physically, communicatively, and/or operatively). In some examples, such connectivity may be provided through a system bus, a network connection, an inter-process communication data structure, or any other method for communicating data.

Power source 304 may provide power to one or more components of computing device 302. Power source 304 may receive power from the primary alternative current (AC) power supply in a building, home, business, or other location. In other examples, power source 304 may be a battery. In still further examples, computing device 302 and/or power source 304 may receive power from another source. Power source 304 may have intelligent power management or consumption capabilities, and such features may be controlled, accessed, or adjusted by one or more modules of computing device 302 and/or by one or more processors 312 to intelligently consume, allocate, supply, or otherwise manage power.

One or more input devices 308 of computing device 302 may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine.

One or more output devices 310 of computing device 302 may generate, receive, or process output. Examples of output are tactile, audio, visual, and/or video output. Output devices 310 may include a display, sound card, video graphics adapter card, speaker, presence-sensitive screen, one or more USB interfaces, video and/or audio output interfaces, or any other type of device capable of generating tactile, audio, video, or other output. Output devices 310 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 306 of computing device 302 may communicate with devices external to computing device 302 by transmitting and/or receiving data, and may operate, in some respects, as both an input device and an output device. In some examples, communication units 306 may communicate with other devices over a network. In other examples, communication units 306 may send and/or receive radio signals on a radio network such as a cellular radio network. In other examples, communication units 306 of computing device 302 may transmit and/or receive satellite signals on a satellite network such as a Global Positioning System (GPS) network. Examples of communication units 306 include a network interface card (e.g. such as an Ethernet card), an optical transceiver, a radio frequency transceiver, a GPS receiver, or any other type of device that can send and/or receive information. Other examples of communication units 306 may include Bluetooth®, GPS, 3G, 4G, LTE, and Wi-Fi® radios found in mobile devices as well as Universal Serial Bus (USB) controllers and the like. In accordance with aspects of this disclosure, communication units 306 may receive data, e.g., images of biometric samples, from acquisition systems 320.

One or more processors 312 of computing device 302 may implement functionality and/or execute instructions associated with computing device 302. Examples of processors 312 include microprocessors, application processors, display controllers, auxiliary processors, one or more sensor hubs, and any other hardware configured to function as a processor, a processing unit, or a processing device. Computing device 302 may use one or more processors 312 to perform operations in accordance with one or more aspects of the present disclosure using software, hardware, firmware, or a mixture of hardware, software, and firmware residing in and/or executing at computing device 302.

One or more storage devices 314 within computing device 302 may store information for processing during operation of computing device 302. In some examples, one or more storage devices 314 are temporary memories, meaning that a primary purpose of the one or more storage devices is not long-term storage. Storage devices 314 on computing device 302 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 314, in some examples, also include one or more computer-readable storage media. Storage devices 314 may be configured to store larger amounts of information than volatile memory. Storage devices 314 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 314 may store program instructions and/or data associated with one or more of the modules described in accordance with one or more aspects of this disclosure.

One or more processors 312 and one or more storage devices 314 may provide an operating environment or platform for one or one more modules, which may be implemented as software, but may in some examples include any combination of hardware, firmware, and software. One or more processors 312 may execute instructions and one or more storage devices 314 may store instructions and/or data of one or more modules. The combination of processors 312 and storage devices 314 may retrieve, store, and/or execute the instructions and/or data of one or more applications, modules, or software. Processors 312 and/or storage devices 314 may also be operably coupled to one or more other software and/or hardware components, including, but not limited to, one or more of the components illustrated in FIG. 3.

One or more modules illustrated in FIG. 3 as being included within storage devices 314 (or modules otherwise described herein) may perform operations described using software, hardware, firmware, or a mixture of hardware, software, and firmware residing in and/or executing at computing device 302. Computing device 302 may execute each of the module(s) with multiple processors or multiple devices. Computing device 302 may execute one or more of such modules as a virtual machine executing on underlying hardware. One or more of such modules may execute as one or more services of an operating system or computing platform. One or more of such modules may execute as one or more executable programs at an application layer of a computing platform.

One or more storage nodes 316 may store information such as one or more shares computed according to biometric information, in accordance with the techniques described herein. In some examples, storage nodes 316 may represent local or remote storage units for storing computer-readable data. For example, storage nodes 110 may represent any or all of hard drives, flash drives, Universal Storage Bus (USB) devices, tape drives, hard drives, floppy disks, compact disks, removable storage devices, etc. that are physically coupled to computing device 302. The combination of processors 312 and storage nodes 316 may function as a storage interface to retrieve, store, and/or execute the instructions and/or data of one or more applications, modules, or software. Processors 312 and/or storage nodes 316 may also be operably coupled to one or more other software and/or hardware components, including, but not limited to, one or more of the components illustrated in FIG. 3.

Computation engine 318 may generally perform tasks relating to computation engine 122 as described elsewhere in this disclosure. For example, execution of instructions associated with computation engine 318 may configure computing device 302 to receive biometric information from one or more acquisition systems 320. Execution of instructions associated with computation engine 318 may cause computing device 302 to generate helper data according to biometric information of a user for authenticating the user. Moreover, execution of instructions association with computation engine 318 may cause computing device 302 to generate a plurality of secret shares of the biometric information according to the biometric information of the user. Additionally, execution of instructions associated with computation engine 318 may cause computing device 302 to store each of the plurality of secret shares of the biometric information to a corresponding one of storage nodes 316. Furthermore, execution of instructions associated with computation engine 318 may configure computing device 302 to perform a re-enrollment of the biometric information by outputting a message to instruct each of storage nodes 316 to generate a respective share of a new helper data in accordance with the plurality of secret shares of the biometric information and a secure protocol, secure multi-party protocol or similar techniques, receiving a respective share of the new helper data from two or more of storage nodes 316, and determine the new helper data based on the respective share of the new helper data from each of the two or more storage nodes 316, wherein the re-enrollment occurs without receiving additional or repeat biometric information of a user and thereby results in faster re-enrollment.

Computation engine 318 may interact with and/or operate in conjunction with one or more modules of computing device 302. Computation engine 318 may receive biometric information and other inputs. Computation engine 318 may receive biometric information from communication units 306.

Acquisition system 320A of FIG. 3 may include power source 322A, one or more communication units 324A, one or more input devices 326A, one or more output devices 328A, one or more processors 330A, one or more storage devices 332A, and one or more sensors 334A. One or more of the devices, modules, storage areas, or other components of acquisition system 320A may be interconnected to enable inter-component communications (physically, communicatively, and/or operatively). In some examples, such connectivity may be provided through a system bus, a network connection, an inter-process communication data structure, or any other method for communicating data. Correspondingly, acquisition system 320N may include power source 322N, one or more communication units 324N, one or more input devices 326N, one or more output devices 328N, one or more processors 330N, one or more storage devices 332N, and one or more sensors 334N, which may include the same or similar capability, features, and/or functionality as similarly numbered components of acquisition system 320A. In some examples, and for certain acquisition systems 320, one or more components, devices, or modules shown in FIG. 3 as being included within one or more acquisition systems 320 may be optional.

Certain aspects of acquisition systems 320 are described below with respect to acquisition system 320A. Other acquisition systems 320 may be described similarly, and may also include the same, similar, or corresponding components, devices, modules, functionality, and/or other features. Descriptions herein with respect to acquisition system 320A may correspondingly apply to one or more other acquisition systems 320. In some examples, and as may be noted, one or more acquisition systems 320 may include more or fewer capabilities, features, components, and/or functionality than other acquisition systems 320.

Power source 322A may provide power to one or more components of acquisition system 320A. In some examples, power source 322A may be a battery. In other examples, power source 322A may receive power from the primary alternative current (AC) power supply in a building, home, or other location. In still further examples, acquisition system 320A and/or power source 322A may receive power from another source. Power source 322A may have intelligent power management or consumption capabilities, and may such features may be controlled, accessed, or adjusted by one or more modules of acquisition system 320A and/or by one or more processors 330A to intelligently consume, allocate, supply, or otherwise manage power.

One or more input devices 326A of acquisition system 320A may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine. One or more output devices 328A of acquisition system 320A may generate, receive, or process output. Examples of output are tactile, audio, visual, and/or video output. Output devices 328A may include a display, sound card, video graphics adapter card, speaker, presence-sensitive screen, one or more USB interfaces, video and/or audio output interfaces, or any other type of device capable of generating tactile, audio, video, or other output. Output devices 328A may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, acquisition system 320A may include a presence-sensitive display that may serve as a user interface device that operates both as one or more input devices 326A and one or more output devices 328A.

One or more communication units 324A of acquisition system 320A may communicate with devices external to acquisition system 320A by transmitting and/or receiving data, and may operate, in some respects, as both an input device and an output device. In some examples, communication unit 324A may communicate with other devices over a network 390. In other examples, communication units 324A may send and/or receive radio signals on a radio network such as a cellular radio network. In other examples, communication units 324A of acquisition system 320A may transmit and/or receive satellite signals on a satellite network such as a Global Positioning System (GPS) network. Examples of communication units 324A include a network interface card (e.g. such as an Ethernet card), an optical transceiver, a radio frequency transceiver, a GPS receiver, or any other type of device that can send and/or receive information. Other examples of communication units 324A may include Bluetooth®, GPS, 3G, 4G, LTE, and Wi-Fi® radios found in mobile devices as well as Universal Serial Bus (USB) controllers and the like.

One or more processors 330A of acquisition system 320A may implement functionality and/or execute instructions associated with acquisition system 320A. Examples of processors 330A include microprocessors, application processors, display controllers, auxiliary processors, one or more sensor hubs, and any other hardware configured to function as a processor, a processing unit, or a processing device. Acquisition system 320A may use one or more processors 330A to perform operations in accordance with one or more aspects of the present disclosure using software, hardware, firmware, or a mixture of hardware, software, and firmware residing in and/or executing at acquisition system 320A.

One or more storage devices 332A within acquisition system 320A may store information for processing during operation of acquisition system 320A. In some examples, one or more storage devices 332A are temporary memories, meaning that a primary purpose of the one or more storage devices is not long-term storage. Storage devices 332A on acquisition system 320A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 332A, in some examples, also include one or more computer-readable storage media. Storage devices 332A may be configured to store larger amounts of information than volatile memory. Storage devices 332A may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 332A may store program instructions and/or data associated with one or more of the modules described in accordance with one or more aspects of this disclosure.

One or more processors 330A and one or more storage devices 332A may provide an operating environment or platform for one or one more modules, which may be implemented as software, but may in some examples include any combination of hardware, firmware, and software. One or more processors 330A may execute instructions and one or more storage devices 332A may store instructions and/or data of one or more modules. The combination of processors 330A and storage devices 332A may retrieve, store, and/or execute the instructions and/or data of one or more applications, modules, or software. Processors 330A and/or storage devices 332A may also be operably coupled to one or more other software and/or hardware components, including, but not limited to, one or more of the components illustrated in FIG. 3.

Figure 4:
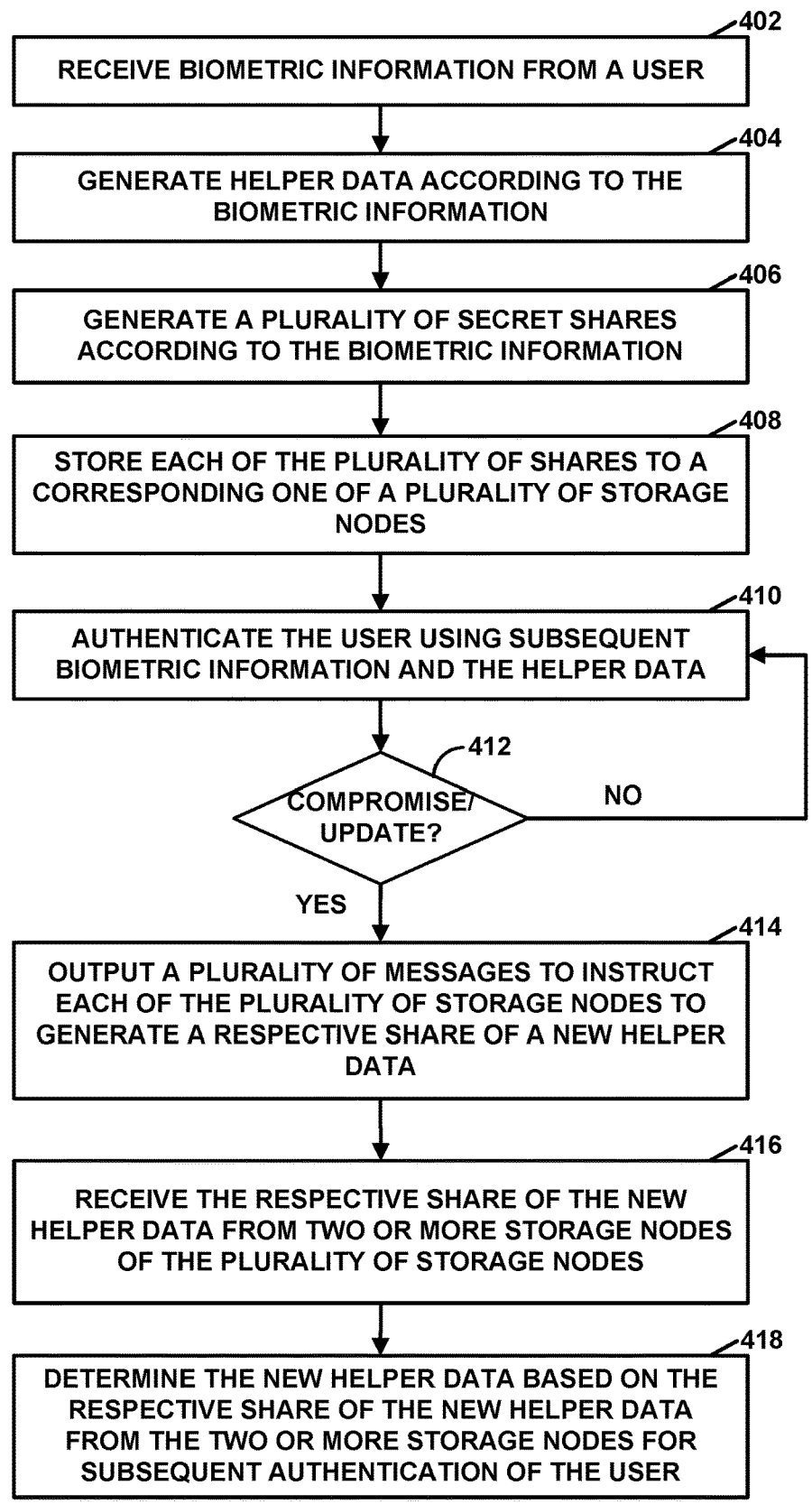
FIG. 4 is a flowchart illustrating an example operation of the computing device, in accordance with one or more aspects described in this disclosure.

FIG. 4 is a flowchart illustrating an example operation of the computing device, in accordance with the techniques described in this disclosure. Although the method of FIG. 4 is described with respect to computing device 120 of FIG. 1, it should be understood that computing device 302 of FIG. 3 may also be configured to perform this or a similar method.

Computing device 120 receives biometric information from a user (402). For example, one of biometric sensors 104 reads a biometric sample from user 106. Acquisition system 102 receives the biometric information and sends the biometric information to computing device 120. Computation engine 122 of computing device 120 may construct a biometric template (e.g., reference biometric template) according to the biometric information. For example, in response to receiving an image of a fingerprint, computing engine 122 may divide the fingerprint image into blocks that each includes a part of the image of the fingerprint. Computation engine 122 determines the coordinates of indicia of the fingerprint in each block (in relation to other blocks) and an orientation of the indicia of the fingerprint (e.g., the direction of an underlying ridge or bifurcation at a particular coordinate). Using these coordinates and orientation of the indicia of the fingerprint, computation engine 122 constructs a biometric template.

Computation engine 122 of computing device 120 may generate helper data according to the biometric information (404). For example, computing engine 122 may use cryptographic algorithms, e.g., fuzzy extractor scheme, fuzzy vault or similar schemes, to generate helper data. The helper data is obtained by binding a key with the biometric template such that the helper data is used to reconstruct the key to authenticate a user.

Computation engine 122, via shares generation unit 124, generates a plurality of secret shares according to the biometric information (406). For example, shares generation unit 124 may convert each of the coordinates and orientations of the biometric template to an integer to be stored in the free term of a respective polynomial (e.g., $p_1(0)=X_1$, $p_2(0)=Y_1$, and $p_3(0)=O_1$). Each of the polynomials (e.g., $p_1(x)$, $p_2(x)$, and $p_3(x)$) may be used to encode the integer of a single minutiae point of the biometric template (e.g., $(X_1,Y_1,O_1)$). Shares generation unit 124 may evaluate each polynomial at "n" points (e.g., $p_1(1)$, $p_1(2)$, $p_1(3)$) of the polynomial (e.g., $p_1(x)$) used to encode a value within the polynomial (e.g., $X_1$ of minutiae point $(X_1,Y_1,O_1)$).

Computing device 120, via a storage interface for interfacing with plurality of storage nodes 110, stores each of the plurality of secret shares to a corresponding one of a plurality of storage nodes (408). In some examples, computing device 120 may use a storage interface to configure connectivity for plurality of storage nodes 110 as offline upon storing each of the plurality of shares to the corresponding one of the plurality of storage nodes.

Computation engine 122 may authenticate the user using subsequent biometric information of the user and the helper data (410). For example, computation engine 122 uses the helper data generated during initial enrollment together with the subsequent biometric information to reconstruct a digital key that is used to authenticate the user.

In the absence of a security breach or update ("NO" branch of step 412), computation engine 122 continues to use the helper data generated during initial enrollment together with the subsequent biometric information to reconstruct a digital key that is used to authenticate the user.

In the event of a security breach or update ("YES" branch of step 412), computation engine 122 performs a re-enrollment of the biometric information by: outputting a plurality of messages to instruct each of the plurality of storage nodes to generate a respective share of a new helper data in accordance with the plurality of secret shares of the biometric information (414) and using a secure protocol, receiving the respective share of the new helper data from two or more storage nodes of the plurality of storage nodes (416), and determining the new helper data based on the respective share of the new helper data from each of the two or more storage nodes for subsequent authentication of the user (418). In this way, computing device 120 may use the storage interface to retrieve respective shares of the new helper data from corresponding storage nodes 110 such that computing engine 122 may determine the new helper data based on the respective shares of the new helper data without having to recover or otherwise reuse the original biometric information for a user and without having to re-acquire additional or repeat biometric information of the user. Further details regarding the re-enrollment operation are described with respect to FIG. 5 below.

Figure 5:
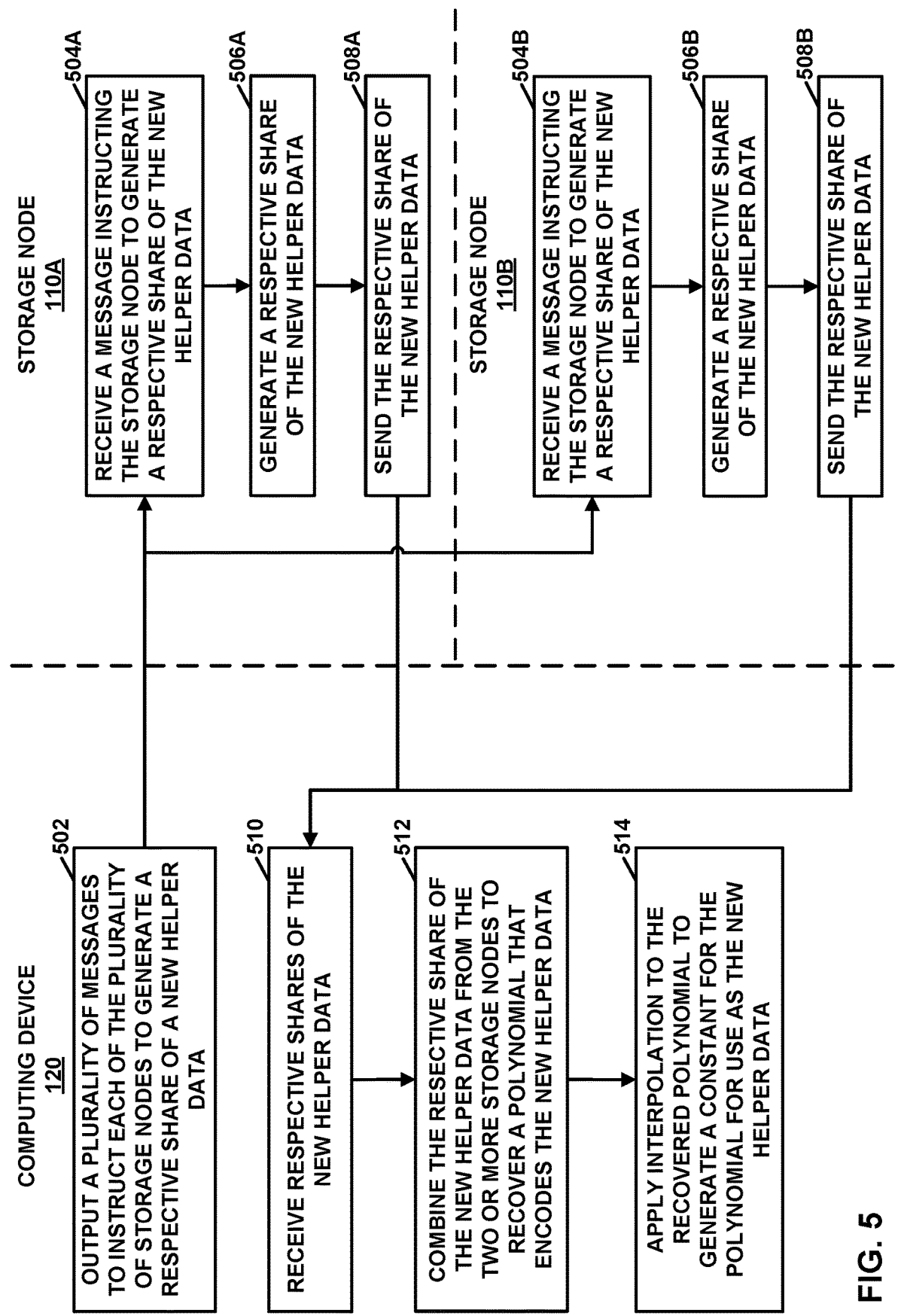
FIG. 5 is a flowchart illustrating an example re-enrollment operation of the computing device, in accordance with one or more aspects described in this disclosure.

FIG. 5 is a flowchart illustrating an example re-enrollment operation in more detail, in accordance with the techniques described in this disclosure. The example of FIG. 5 is described with respect to storage nodes 110A and 110B of FIG. 1, but may include any two or more storage nodes 110 of FIG. 1.

In the example of FIG. 5, computing device 120 may output a plurality of messages to instruct each of the plurality of storage nodes (e.g., storage node 110A and 110B) to generate a respective share of a new helper data in accordance with the plurality of secret shares of the biometric information and a secure protocol or similar techniques (502). In some examples, computing device 120 may use the storage interface to automatically reconfigure connectivity for storage nodes 110A and 110B as online when performing re-enrollment. In response to storage nodes 110A and 110B becoming online, computing device 120 may output a plurality of messages, via message handler 128, to storage nodes 110A and 110B, such that storage nodes 110A and 110B may each generate a respective share of the new helper data.

Storage nodes 110A and 110B may receive messages (504A and 504B), and may each generate a respective share of the new helper data through communication with other storage nodes. For example, storage node 110A may generate a share of the new helper data according to the secret shares stored in storage node 110A (506A). Storage node 110B may generate another share of the new helper data according to the secret shares stored in storage node 110B (506B). For example, storage nodes 110A, 110B may each be instructed to perform a sequence of operations such as addition and multiplication operations to compute the generate function of a fuzzy extractor scheme in a secure distributed manner without reconstructing the secret shared biometric and thus generating new helper data shares 114.

Storage nodes 110A and 110B may send the respective shares of the new helper data to computing device 120 (508A and 508B). For example, storage nodes 110A and 110B may each send a message including the respective share of the new helper data to computing device 120. In this way, the secret shares of the biometric information that are stored in storage nodes 110A and 110B are not revealed when generating new helper data for re-enrollment.

Computing device 120 may receive the respective shares of the new helper data (510). For example, computing device 120 may use the storage interface to receive a respective share of a new helper data from storage nodes 110A and 110B. In some examples, computing device 120 may use the storage interface to configure storage nodes 110A and 110B as offline in response to receiving the respective shares of the new helper data from storage nodes 110A and 110B.

Computing device 120 may determine the new helper data based on the respective shares of the new helper data from storage nodes 110A and 110B for subsequent authentication of the user. For example, computation engine 122 of computing device 120 may combine the respective shares of the new helper data from storage nodes 110A and 110B to recover a new polynomial that encodes the new helper data (512). Computing engine 122 may apply interpolation to the recovered polynomial to generate a constant for the polynomial for use as the new helper data (514).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A method comprising:
   generating, by a computation engine of a biometric authentication system and according to biometric information of a user, helper data for authenticating the user;
   generating, by the computation engine, a plurality of secret shares of the biometric information;
   storing, by the computation engine, each of the plurality of secret shares of the biometric information to a corresponding one of a plurality of storage nodes; and
   performing, by the computation engine, re-enrollment of the biometric information by:
      outputting a plurality of messages to instruct each of the plurality of storage nodes to generate a respective share of a new helper data in accordance with the plurality of secret shares of the biometric information and a secure computation protocol,
      receiving the respective share of the new helper data from two or more storage nodes of the plurality of storage nodes, and
      determining the new helper data based on the respective share of the new helper data from each of the two or more storage nodes for subsequent authentication of the user,
   wherein the re-enrollment occurs without receiving additional or repeat biometric information of the user and thereby results in faster re-enrollment.

2. The method of claim 1, wherein generating the plurality of secret shares of the biometric information of the user comprises:
   configuring a plurality of polynomials, wherein each polynomial of the plurality of polynomials is used to encode a portion of the biometric information; and
   generating a plurality of secret shares of each polynomial of the plurality of polynomials, wherein the plurality of secret shares are used to generate the respective share of the new helper data.

3. The method of claim 2, wherein storing each of the plurality of secret shares of the biometric information to the corresponding one of the plurality of storage nodes comprises:
   storing each of the plurality of secret shares of each polynomial of the plurality of polynomials to the corresponding one of the plurality of storage nodes.

4. The method of claim 1, wherein determining the new helper data based on the respective share of the new helper data from each of the two or more storage nodes for subsequent authentication of the user comprises:
   combining the respective share of the new helper data from each of the two or more storage nodes to recover a polynomial that encodes the new helper data.

5. The method of claim 4, further comprises applying interpolation to the recovered polynomial to generate a constant for the polynomial for use as the new helper data.

6. The method of claim 1, wherein performing the re-enrollment comprises performing a bulk re-enrollment of the biometric information for a plurality of users.

7. The method of claim 1, further comprising:
   configuring, by the computation engine, connectivity for the plurality of storage nodes as offline upon storing each of the plurality of secret shares of the biometric information to the corresponding one of the plurality of storage nodes;
   automatically reconfiguring, by the computation engine, connectivity for two or more storage nodes of the plurality of storage nodes as online when performing re-enrollment;
   in response to the two or more storage nodes becoming online, receiving, by the computation engine, the respective share of the new helper data from the two or more storage nodes of the plurality of storage nodes; and
   in response to receiving the respective share of the new helper data from each of the two or more storage nodes of the plurality of storage nodes, configuring, by the computation engine, the two or more storage nodes of the plurality of storage nodes as offline.

8. The method of claim 1, wherein generating the plurality of secret shares of the biometric information comprises generating the plurality of secret shares of the biometric information according to indicia of the biometric information.

9. A computing device of a biometric authentication system comprising:
   a shares generation unit implemented in circuitry and configured to generate a plurality of secret shares of biometric information of a user;
   a storage interface implemented in circuitry and configured to:
      interface with a plurality of storage nodes for storing each of the plurality of secret shares to a corresponding one of the plurality of storage nodes; and
   a computation engine implemented in circuitry and configured to:
      generate helper data according to biometric information of the user for authenticating a user, and
      perform a re-enrollment of the biometric information, wherein to perform the re-enrollment of the biometric information, the computation engine is configured to:
         output a plurality of messages to instruct each of the plurality of storage nodes to generate a respective share of a new helper data in accordance with the plurality of secret shares of the biometric information and a secure computation protocol,
         receive the respective share of a new helper data from two or more storage nodes of the plurality of storage nodes, and determine the new helper data based on the respective share of the new helper data from each of the two or more storage nodes for subsequent authentication of the user, wherein the re-enrollment occurs without receiving additional or repeat biometric information of a user and thereby results in faster re-enrollment.

10. The computing device of claim 9, wherein, to generate the plurality of secret shares of the biometric information of the user, the shares generation unit is further configured to:
configure a plurality of polynomials, wherein each polynomial of the plurality of polynomials is used to encode a portion of the biometric information; and
generate a plurality of secret shares of each polynomial of the plurality of polynomials, wherein the plurality of secret shares are used to generate the respective share of the new helper data.

11. The computing device of claim 9, wherein, to interface with a plurality of storage nodes for storing each of the plurality of secret shares of the biometric information to the corresponding one of the plurality of storage nodes, the storage interface is further configured to:
interface with the plurality of storage nodes to store each of the plurality of secret shares of each polynomial of the plurality of polynomials to the corresponding one of the plurality of storage nodes.

12. The computing device of claim 9, wherein, to determine the new helper data based on the respective share of the new helper data from each of the two or more storage nodes for subsequent authentication of the user, the computation engine is further configured to:
combine the respective share of the new helper data from each of the two or more storage nodes to recover a polynomial that encodes the new helper data.

13. The computing device of claim 12, wherein the computation engine is further configured to apply interpolation to the recovered polynomial to generate a constant for the polynomial for use as the new helper data.

14. The computing device of claim 9, wherein the re-enrollment is a bulk re-enrollment of the biometric information for a plurality of users.

15. The computing device of claim 9, the storage interface is further configured to:
configure connectivity for the plurality of storage nodes as offline upon storing each of the plurality of secret shares of the biometric information to the corresponding one of the plurality of storage nodes;
automatically reconfigure connectivity for two or more storage nodes of the plurality of storage nodes as online when performing re-enrollment;
in response to two or more storage nodes becoming online, receive the respective share of the new helper data from the two or more storage nodes of the plurality of storage nodes; and
in response to receiving the respective share of the new helper data from each of the two or more storage nodes of the plurality of storage nodes, configure the two or more storage nodes of the plurality of storage nodes as offline.

16. The computing device of claim 9, wherein, to generate the plurality of secret shares of the biometric information, the shares generation unit is further configured to generate the plurality of shares of the biometric information according to indicia of the biometric information.

17. A non-transitory computer-readable storage medium of a biometric authentication system having stored thereon instructions that, when executed, cause a processor to:
generate, according to biometric information of a user, helper data for authenticating the user;
generate, according to the biometric information of the user, a plurality of secret shares of the biometric information;
store each of the plurality of secret shares of the biometric information to a corresponding one of a plurality of storage nodes; and
perform re-enrollment of the biometric information, wherein the instructions to perform re-enrollment of the biometric information comprise instructions that, when executed, cause the processor to:
output a plurality of messages to instruct each of the plurality of storage nodes to generate a respective share of a new helper data in accordance with the plurality of secret shares of the biometric information and a secure computation protocol,
receive a respective share of the new helper data from two or more storage nodes of the plurality of storage nodes, and
determine the new helper data based on the respective share of the new helper data from each of the two or more storage nodes for subsequent authentication of the user,
wherein the re-enrollment occurs without receiving additional or repeat biometric information of a user and thereby results in faster re-enrollment.

18. The non-transitory computer-readable storage medium of claim 17, wherein the instructions to generate the plurality of secret shares of the biometric information of the user comprise instructions that, when executed, cause the processor to:
configure a plurality of polynomials, wherein each polynomial of the plurality of polynomials is used to encode a portion of the biometric information; and
generate a plurality of secret shares of each polynomial of the plurality of polynomials, wherein the plurality of secret shares are used to generate the respective share of the new helper data.

19. The non-transitory computer-readable storage medium of claim 17, wherein the instructions to determine the new helper data based on the respective share of the new helper data from each of the two or more storage nodes for subsequent authentication of the user comprise instructions that, when executed, cause a processor to:
combine the respective share of the new helper data from each of the two or more storage nodes to recover a polynomial that encodes the new helper data; and
apply interpolation to the recovered polynomial to generate a constant for the polynomial for use as the new helper data.

20. The non-transitory computer-readable storage medium of claim 17, wherein the instructions further comprise instructions that, when executed, cause a processor to:
configure connectivity for the plurality of storage nodes as offline upon storing each of the plurality of secret shares of the biometric information to the corresponding one of the plurality of storage nodes;
automatically reconfigure connectivity for two or more storage nodes of the plurality of storage nodes as online when performing re-enrollment;
in response to the two or more storage nodes becoming online, receive the respective share of the new helper data from the two or more storage nodes of the plurality of storage nodes; and
in response to receiving the respective share of the new helper data from each of the two or more storage nodes of the plurality of nodes devices, configure the two or more storage nodes of the plurality of storage nodes as offline.

* * * * *